United States Patent [19]

Ishii et al.

[11] Patent Number: 5,489,629
[45] Date of Patent: Feb. 6, 1996

[54] RUBBER-MODIFIED POLYSTYRENE RESIN COMPOSITIONS

[75] Inventors: Takahiro Ishii, Sodegaura; Hayato Kihara; Shuji Yoshimi, both of Ichihara; Hiroshi Miyagi, Ibaraki, all of Japan

[73] Assignee: Sumitomo Chemical Company, Ltd., Osaka, Japan

[21] Appl. No.: 291,462

[22] Filed: Aug. 17, 1994

[30] Foreign Application Priority Data

Oct. 18, 1993 [JP] Japan .................................. 5-259662
Dec. 3, 1993 [JP] Japan .................................. 5-304036

[51] Int. Cl.$^6$ .......................... C08F 279/02; C08F 287/00
[52] U.S. Cl. ............................................. 525/316
[58] Field of Search ........................................ 525/316

[56] References Cited

U.S. PATENT DOCUMENTS

| | | | |
|---|---|---|---|
| 4,096,205 | 6/1978 | Reith | 525/316 |
| 4,143,098 | 3/1979 | Murphy | 525/316 |
| 4,433,099 | 2/1984 | Kupper | 525/316 |
| 4,513,120 | 4/1985 | Bennett | 525/316 |
| 4,908,414 | 3/1990 | Bronstert | 525/316 |
| 4,985,503 | 1/1991 | Bronstert | 525/316 |
| 5,112,921 | 12/1992 | Schwaben et al. | 525/316 |
| 5,206,302 | 4/1993 | Kohsaka | 525/316 |
| 5,210,132 | 5/1993 | Matsubara | 525/316 |
| 5,231,142 | 7/1993 | Tsubokura | 525/316 |

FOREIGN PATENT DOCUMENTS

| | | |
|---|---|---|
| 0015751 | 9/1980 | European Pat. Off. . |
| 0377890 | 7/1990 | European Pat. Off. . |
| 48-45590 | 6/1973 | Japan . |
| 2170806 | 7/1990 | Japan . |
| 1035944 | 7/1966 | United Kingdom . |

Primary Examiner—Vasu S. Jagannathan
Attorney, Agent, or Firm—Sughrue, Mion, Zinn, Macpeak & Seas

[57] ABSTRACT

Disclosed are a rubber-modified polystyrene resin composition which comprises a polystyrene resin serving as a matrix and soft component particles as dispersed therein, the composition fulfilling the following requirements (a) to (d):

(a) the polystyrene resin as the matrix satisfies the following requirements:

$$150,000 \leq Mw \leq 500,000$$

wherein Mw is the weight average molecular weight, and $$2 \leq Bn(Mz) \leq 20$$

wherein Bn(Mz) is the branch count or the number of branching points in the Z-average molecular weight (Mz), (b) the soft component particles in the composition have an average particle diameter (Dp) of 0.1 to 10 μm, (c) the soft component particles in the composition have a swelling index in the range of 3 to 30, and (d) the proportion of the soft component particles in the composition is in the range of 5 to 30% by weight, as well as an injection-molded article formed from the composition.

13 Claims, No Drawings

RUBBER-MODIFIED POLYSTYRENE RESIN COMPOSITIONS

FIELD OF THE INVENTION

The present invention relates to rubber-modified polystyrene resin compositions and injection molded articles formed therefrom. More particularly, the present invention relates to a rubber-modified polystyrene resin composition which contains a rubber elastomer to improve the impact strength of polystyrene and which has a high heat resistance and flowability. The invention also concerns with rubber-modified polystyrene resin compositions suitable for producing molded articles such as household electric appliances, household articles, miscellaneous goods, etc., and injection-molded articles having a highly glossy appearance.

PRIOR ART

Rubber-modified polystyrene resin compositions prepared from a polystyrene resin and a rubber-like polymer are known as a high impact polystyrene (HIPS). Such high impact polystyrene is useful as a resin having an impact strength improved without marked decrease in the level of rigidity which is possessed by conventional polystyrenes. Thus, rubber-modified polystyrene resin compositions are preferably used in producing molded articles such as household electric appliances, household articles, miscellaneous goods, etc.

Processes for preparing high impact polystyrenes are known which comprise adding to a styrene monomer a diene type rubber elastomer such as polybutadiene, styrene-butadiene copolymers, etc., and polymerizing the mixture with stirring, whereby a rubber-modified polystyrene resin composition is produced. The obtained composition has a structure in which particles of soft component, composed of the rubber elastomer and a polystyrene resin, exist as dispersed in polystyrene matrix. However, the rubber-modified polystyrene resin compositions obtained by such conventional processes have problems. That is to say, these polystyrene resin compositions show a lower flowability during molding such as injection molding than non-modified polystyrene resin compositions, and the highly glossy articles prepared by injection-molding the conventional rubber-modified polystyrene resin composition have the problem that a portion thereof corresponding to a cavity part which is away from a gate is less glossy.

In order to cope with these problems, it is known to improve the flowability of the resin (1) by reducing the molecular weight of the matrix polystyrene, or (2) by adding a plasticizer predominantly comprising a liquid paraffin such as mineral oils, etc. However, method (1) has a drawback that the strength of the molded articles is reduced, and method (2) has the problem that the heat resistance of the resin composition is impaired.

In view of these problems, there have been demands for rubber-modified polystyrene resin compositions having excellent heat resistance and flowability which can be prepared without reducing the molecular weight of the matrix and without necessitating the use of a mineral oil, and there also have been demands for injection-molded articles of highly glossy appearance.

SUMMARY OF THE INVENTION

An object of the present invention is to provide rubber-modified polystyrene resin compositions containing a rubber elastomer to improve the impact strength of polystyrene and possessing high heat resistance and flowability.

Another object of the invention is to provide an injection-molded articles having a highly glossy appearance.

The inventors of the present invention conducted extensive research to solve the foregoing problems and completed the present invention.

The present invention provides a rubber-modified polystyrene resin composition which comprises a polystyrene resin serving as matrix and soft component particles as dispersed therein, the composition fulfilling the following requirements (a) to (d):

(a) the polystyrene resin acting as the matrix satisfies the following requirements;

$$150,000 \leq Mw \leq 500,000$$

wherein Mw is the weight average molecular weight, and $$2 \leq Bn(Mz) \leq 20$$

wherein $Bn(Mz)$ is the branch count or the number of branching points in the Z-average molecular weight (Mz), (b) the soft component particles in the composition have an average particle diameter (Dp) of 0.1 to 10 μm;

(c) the soft component particles in the composition have a swelling index in the range of 3 to 30, and (d) the proportion (by weight) of the soft component particles in the composition is in the range of 5 to 30% by weight (hereinafter called "first invention").

The present invention also provides the rubber-modified polystyrene resin composition according to the first invention wherein the soft component particles have an average particle diameter (Dp) of 0.1 to 1.5 μm (hereinafter called "second invention").

The present invention further provides an injection-molded article formed from the rubber-modified polystyrene resin composition of the second invention (hereinafter called "third invention").

DETAILED DESCRIPTION

The present invention will be described below in more detail.

Examples of the styrene monomer for forming the polystyrene resin in the rubber-modified polystyrene resin composition of the present invention are styrene, α-substituted alkylstyrenes such as α-methylstyrene, etc., and nuclearly substituted alkylstyrenes such as p-methylstyrene. Such styrene monomer can be used in combination with a compound copolymerizable with the styrene monomer, such as acrylonitrile, methacrylonitrile, methacrylic acid, methyl methacrylate and like vinyl monomers, maleic anhydride, maleimide, nuclearly substituted maleimide, etc.

Examples of useful rubber elastomers are polybutadiene, styrene-butadiene copolymers, ethylene-propylene-nonconjugated diene terpolymers, etc. Among them, polybutadiene and styrene-butadiene copolymers are the most preferred. As the polybutadienes, either a high-cis polybutadiene (high cis content) or a low-cis polybutadiene (low cis content) can be used.

The polystyrene resin serving as the matrix of the rubber-modified polystyrene resin composition of the invention has a weight average molecular weight of 150,000 to 500,000. If the weight average molecular weight is less than 150,000, low impact strength results, whereas if the weight average molecular weight is more than 500,000, the composition is poor in flowability.

Herein, the weight average molecular weight of the resin was evaluated by the following method. About 0.5 g of the rubber-modified polystyrene resin composition was dissolved in a methyl ethyl ketone-methanol solvent mixture (MEK/MeOH volume ratio=10/1). The solution was centrifuged to separate the composition into the matrix polystyrene and the soft component as an insoluble matter. A supernatant liquid free of the insoluble matter was separated by decantation and added slowly to 500 ml of methanol with stirring to precipitate the polymer fraction. Using a glass filter (GS 25), the polymer fraction was filtered and dried to remove the methanol. The dry sample thus obtained was dissolved in tetrahydrofuran to a concentration of 0.5 g/ml. The solution was subjected to gel permeation chromatography (GPC) to determine the weight average molecular weight of the matrix polystyrene resin. The gel permeation chromatograph (GPC) used was equipped with a differential refractometer as a detector, and the weight average molecular weight was calculated with a calibration curve made using a monodisperse polystyrene.

The rubber-modified polystyrene resin composition of the invention is 2 to 20, preferably 3 to 15, in the Z-branch count or the number of branching points ($Bn(Mz)$) in the Z-average molecular weight ($Mz$). If this Z-branch count is far less than 2, the balance between the flowability and the heat resistance is poor and the impact strength is reduced. On the other hand, if the Z-branch count is far more than 20, a low flowability is imparted and the appearance of the molded article is impaired. The branch count or the number of branching points ($Bn(M)$) in the molecular weight ($M$) can be determined by a viscosity-GPC method using a gel permeation chromatograph (GPC) equipped with a differential refractometer and a viscometer as detectors. The details of this method are described in Journal of the Society of Rubber Industry, Japan, Vol. 45, No. 2, pp. 105–118 (1972). The branch count or the number of branching points ($Bn(Mz)$) for the molecular weight ($Mz$) can be calculated by the following equation:

$$[IV(Mz)/IV_L(Mz)]^{1/2} = [(1+Bn(Mz)/7)^{1/2} + 4/9 \cdot Bn(Mz)]^{-1/2}$$

wherein $IV(Mz)$ and $IV_L(Mz)$ are the intrinsic viscosity values, for $Mz$, of the test sample and the standard linear polystyrene sample, respectively, as determined by the viscosity GPC method. The number of branching points in the Z-average molecular weight is the value for the Z-average molecular weight among the numbers of branching points in the various molecular weights as determined by the viscosity GPC method.

The rubber-modified polystyrene resin composition of the invention is composed of the polystyrene resin as the matrix and the soft component particles as dispersed in the matrix. The average particle diameter of the soft component particles ranges from 0.10 to 10 µm, preferably from 0.15 to 5 µm. If the average particle diameter is far less than 0.1 µm, a poor impact strength results, whereas if the average particle diameter is far larger than 10 µm, the obtained molding is inferior in surface appearance characteristics.

Of the rubber-modified polystyrene resin compositions of the invention, the composition containing the soft component particles having an average particle diameter of 0.1 to 1.5 µm and fulfilling the foregoing requirements (a), (c) and (d), i.e., the requirements of claim 1, has well balanced flowability and heat resistance, and the molded articles prepared, for example, by injection-molding the composition not only are glossy in the portion corresponding to the vicinity of a gate, but also exhibit a lesser degree of gloss reduction in the portion corresponding to a mold part which is away from the gate, with the result that such composition can give molded articles having excellent appearance and is suitable for applications in the field of molded articles which require high gloss. If the average particle diameter is less than 0.1 µm, the resulting molded articles will have reduced impact strength, whereas the use of the particles having an average particle diameter of more than 1.5 µm results in lowered glossiness of the molded article as a whole, hence unsuitable so far as the applications in the field of molded articles requiring high gloss are concerned.

Herein, the average particle diameter is measured as follows. In a transmission electron micrograph taken of a ultra-thin slice of the rubber-modified polystyrene resin composition of the invention, the particle diameter each of 200 to 500 soft component particles is measured, and the average particle diameter is calculated by the following equation:

$$\text{Average particle diameter} = \Sigma n_i D_i^2 / \Sigma n_i D_i$$

wherein $n_i$ is the number of soft component particles having a particle diameter $D_i$ and $\Sigma$ means a sum for values of $i$. If the particle is not of complete circle, the particle diameter thereof is defined by the average value of its maximum and minimum particle sizes.

The swelling index of the soft component particles in the rubber-modified polystyrene resin composition of the invention should be in the range of 3 to 30, preferably 8 to 20. If the swelling index is less than 3, a lower impact strength results, whereas if it is more than 30, reduced rigidity or reduced flexural modulus results, hence undesirable for practical purposes.

Herein, the swelling index is measured by the following method. The resin composition (about 1.0 g) is dissolved in 50 ml of toluene at room temperature and left to stand for one day. The obtained toluene solution is centrifuged (10000 rpm×30 minutes) to separate the insoluble matter. The supernatant is removed and the insoluble matter is weighed. The thus measured weight is designated "a". Then, the insoluble matter is dried in a vacuum dryer at 70° C. for 3 hours, and the thus-measured dry weight is designated "b". The swelling index is calculated by the following formula $$(a-b)/b$$

wherein a and b are as defined above.

The proportion (by weight) of the soft component particles in the rubber-modified polystyrene resin composition of the invention should be in the range of 5 to 30% by weight, preferably 8 to 30% by weight. If the proportion of the soft component particles is far less than 5% by weight, a reduced impact strength is imparted, whereas if the proportion is far more than 30% by weight, lower rigidity or lower flexural modulus results, hence undesirable for practical use.

The proportion of the soft component particles is determined by the following method. The resin composition (0.5 g) is dissolved in 50 ml of a methyl ethyl ketone/methanol solvent mixture (volume ratio=10/1) and then the insolubles precipitated are separated and dried, and the proportion is calculated by the dry weight of the insolubles to the weight of the resin composition (0.5 g).

The rubber-modified polystyrene resin composition of the invention can be prepared by bulk polymerization or bulk-suspension polymerization.

In the case of bulk polymerization, the composition can be prepared by the following method. A solution of 3 to 20 parts by weight of a rubber elastomer in 100 parts by weight of a styrene monomer, which may further contain a diluent such as toluene, ethylbenzene, etc., is continuously fed to at least one thorough mixing type stirring vessel for polymerization to conduct polymerization until soft component particles are formed and a conversion of about 20 to about 50% by weight, preferably about 25 to about 45% by weight, is reached. Then, the resulting polymerization reaction mixture is transferred to a polymerization vessel, which is connected to the thorough mixing type stirring vessel, for conducting polymerization until the final conversion reaches at least 60% by weight, preferably at least 70% by weight.

In said procedure, the polymerization in the thorough mixing type stirring vessel is conducted after 100 to 800 wt. ppm, relative to the styrene monomer, of a compound having a plurality of vinyl groups and copolymerizable with the styrene monomer is homogeneously mixed with said solution of the rubber elastomer in a styrene monomer prior to the polymerization. Alternatively, in said procedure, said compound having a plurality of vinyl groups and copolymerizable with the styrene monomer is homogeneously mixed with the polymerization reaction mixture after the soft component particles are formed, and the resulting mixture is subjected to the polymerization. In either case, the polymerization reaction in each step is preferably conducted at a temperature which is equal to or higher than the temperature T (° C.) defined by the following equation:

$$T=0.05 \times M+120$$

wherein M is the amount (wt. ppm) of the compound having a plurality of vinyl groups and copolymerizable with the styrene monomer. It is preferable to conduct the polymerination at a temperature equal to or higher than T but lower than (T+60) ° C.

Then, the polymerization reaction mixture thus obtained is introduced into a preheater maintained at 200° to 280° C. and is caused to pass through a vacuum deaerator at 200° to 280° C. to recover the unreacted monomer and/or the diluent such as toluene, ethylbenzene or the like, whereby the desired polystyrene resin composition of the invention can be obtained.

The amount of the rubber elastomer to be used in the invention is generally in the range of 3 to 20 parts by weight per 100 parts by weight of the styrene monomer. The use of an excessively lesser amount of the elastomer reduces the impact strength, and the use of an excessively larger amount thereof lowers the rigidity and flexural modulus, hence practically undesirable.

Useful compounds which have a plurality of vinyl groups and which are copolymerizable with the styrene monomer include, for example, divinylbenzene, ethylene glycol dimethacrylate, etc. If the amount of said compound is excessively less than the above-specified range, balance between the heat resistance and the flowability is poor. If the amount of said compound used is excessively larger than the above-specified range, a low flowability is imparted to the composition, making the composition unsuitable for molding.

If polymerization in the thorough mixing type stirring vessel is conducted until a conversion of higher than 50% by weight is reached and then the compound having a plurality of vinyl groups is added to the reaction mixture in a plugflow type polymerization vessel (i.e., a tower reactor) and the polymerization is continued, a three-dimensionally crosslinked portion will be formed in the obtained composition as a result of homopolymerization of the compound containing a plurality of vinyl groups, and the flowability of the composition during molding will be impaired.

If the polymerization is terminated before achieving the contemplated final conversion and then the polymerization reaction mixture is deaerated, unreacted vinyl groups of the compound having a plurality of vinyl groups remain in the polymer, with the result that a satisfactorily branched structure is not formed and the heat resistance and the flowability are ill-balanced. If the temperature in the preheater and the temperature in the vacuum deaerator are excesssively lower or excesssively higher than the above-specified range, the obtained resin composition is poor in the balance between the heat resistance and the flowability.

Thus, according to the present invention, there is provided a process for preparing said rubber-modified polystyrene resin composition of the invention, the process comprising the steps of:

(i) continuously feeding a solution of 3 to 20 parts by weight of a rubber elastomer in 100 parts by weight of a styrene monomer to at least one thorough mixing type stirring polymerization vessel to effect polymerization, until soft component particles are formed and a conversion of about 20 to about 50% by weight is reached, and (ii) continuously feeding the polymerization reaction mixture obtained in step (i) to a continuously arranged polymerization vessel which is connected to said thorough mixing type stirring vessel to further effect polymerization until a final conversion of at least 60% by weight is reached, wherein 100 to 800 wt. ppm, relative to the styrene monomer, of a compound having a plurality of vinyl groups and copolymerizable with the styrene monomer is homogeneously mixed with the solution of the rubber elastomer in the styrene monomer in advance (followed by the polymerization in said thorough mixing type stirring polymerization vessel), or is homogeneously mixed with the polymerization reaction mixture after the soft component particles are formed (followed by the polymerization), and wherein the polymerization in steps (i) and (ii) is conducted at a temperature which is equal to or higher than the temperature T (° C.) defined by the following equation:

$$T=0.05 \times M+120$$

wherein M is the amount (wt. ppm) of the compound having a plurality of vinyl groups and copolymerizable with the styrene monomer, (iii) introducing the polymerization reaction mixture obtained in step (ii) into a preheater maintained at 200° to 280° C., and (iv) passing said mixture through a vacuum deaerator at 200° to 280° C. to recover the unreacted monomer.

The foregoing bulk-suspension polymerization is effected as follows. First, 3 to 25 parts by weight of a rubber elastomer is dissolved in 100 parts by weight of a styrene monomer in a thorough mixing type stirring polymerization vessel, wherein the polymerization is conducted until the soft component particles are formed and a conversion of about 10 to about 50% by weight, preferably about 15 to about 30% by weight, is reached.

In said procedure, 100 to 800 wt. ppm, relative to the styrene monomer, of a compound having a plurality of vinyl groups and copolymerizable with the styrene monomer is homogeneously mixed with the solution of the rubber elastomer in the styrene monomer in advance, and the polymerization is conducted in the thorough mixing type stirring polymerization vessel. Alternatively, in said procedure, the compound having a plurality of vinyl groups and copolymerizable with the styrene monomer is homogeneously mixed with the polymerization reaction mixture after the soft component particles are formed, and the resulting mixture is subjected to the polymerization.

Thereafter, the resulting polymerization reaction mixture is suspended in water containing a suspending agent, and a suspension polymerization is conducted in a conventional manner in the presence of a polymerization initiator to complete the polymerization, whereby the desired rubber-modified polystyrene resin composition is obtained.

Thus, according to the present invention, there is also provided a process for preparing said rubber-modified polystyrene resin composition of the invention, the process comprising the steps of:

(i) dissolving 3 to 25 parts by weight of a rubber elastomer in 100 parts by weight of a styrene monomer in a thorough mixing type stirring vessel for polymerization, in which the polymerization is conducted until soft component particles are formed and a conversion of about 15 to about 50% by weight is reached, wherein 100 to 800 ppm by weight, relative to the styrene monomer, of a compound having a plurality of vinyl groups and copolymerizable with the styrene monomer is either homogeneously mixed with the solution of the rubber elastomer in the styrene monomer in advance (followed by the polymerization in said thorough mixing type stirring vessel), or is homogeneously mixed with the polymerization reaction mixture after the soft component particles are formed (followed by the polymerization), and (ii) suspending the resulting polymerization reaction mixture obtained in step (i) in water containing a suspending agent, and subjecting the resulting suspension to suspension polymerization in the presence of a polymerization initiator to complete the polymerization.

In the processes for preparing the rubber-modified polystyrene resin composition of the invention, additives such as chain transfer agents, polymerization initiators, plasticizers, antioxidants, etc. can be suitably used, when so required.

If desired, the rubber-modified polystyrene resin composition of the invention may further contain silicone oils for imparting improved impact strength, mold release agents conventionally incorporated into resin compositions for injection molding such as stearic acid, zinc stearate and calcium stearate, plasticizers such as mineral oil, lubricants, antistatic agents, antioxidants, ultraviolet absorbers, heat stabilizers, pigments, dyes, etc. Furthermore the rubber-modified polystyrene resin composition of the invention may optionally contain conventional rubber-modified polystyrene resin compositions or regenerated rubber-modified polystyrene compositions in an amount which does not impair the contemplated effects of the present invention.

The rubber-modified polystyrene resin composition of the invention is molded by the conventional methods. For example, the composition is molded with use of a conventional injection molding machine, for example, at a mold temperature of 40° C.

EXAMPLES

The present invention will be described below with reference to the following examples, to which, however, the invention is not limited.

The data shown in the examples are measured according to the following methods.
(1) Vicat softening point (heat resistance)
   Measured according to JIS K7206, B method.
(2) Melt flow rate (flowability)
   Measured according to JIS K7210 at 200° C. under a load of 5 kgf.
(3) Izod impact strength (impact resistance)
   Measured according to JIS K7110 using a sample of 3.0 mm in thickness with a notch at 23° C.
(4) Flexural modulus (rigidity)
   Measured according to JIS K7203 at 23° C.
(5) Appearance of molding
   The composition was injection-molded into a flat rectangular plate, 400×100×3 mm. The gloss of the rectangular plate was evaluated according to JIS K7105 (method of measuring gloss) by determining the gloss ($G_{05}$) in its central portion which was 50 mm away from one of the longitudinally opposing ends thereof (the plate's short side) which corresponds to the gate of the injection molding machine, and the gloss ($G_{35}$) in its central portion which was 350 mm away therefrom. The gloss reduction degree was evaluated as the value calculated by the formula: $((G_{35})/(G_{05}))\times 100$ (%). The molding of the rectangular plate was conducted with use of an injection molding machine (trade name "IS-150E," product of Toshiba Corporation) at a mold temperature of 40° C. The greater value of the gloss reduction degree is indicative of the better surface appearance.

EXAMPLE 1

A thorough mixing type stirring vessel for polymerization was charged with a mixture of 6.4 parts by weight of a middle cis-polybutadiene (product of Asahi Chemical Industry Co., Ltd., trade name "Diene 55AS"), 100 parts by weight of styrene, 5.5 parts by weight of ethylbenzene, 0.7 part by weight of a mineral oil, 0.03 part by weight of t-dodecylmercaptan and 340 wt. ppm (relative to styrene) of divinylbenzene (as the compound containing at least two vinyl groups : purity of 55% by weight, manufactured by Tokyo Kasei Kogyo Co., Ltd.). The mixture was polymerized in the vessel at 137° C. with stirring at 150 rpm until a conversion of 27% by weight was reached.

The obtained polymerization mixture was subjected to further polymerization until the conversion reached 74% by weight using a plugflow type polymerization vessel at a temperature of 130° to 165 ° C.

The polymerization mixture was introduced into a preheater maintained at a temperature of 225° C. and then passed through a vacuum deaerator maintained at 250° C. to evaporate off the volatile matters, whereby a rubber-modified polystyrene resin composition was obtained in the form of pellets.

The soft component particles in the composition had a so-called salami structure (cellular structure) wherein a plurality of styrene resin fine particles were present as dispersed in the continuous phase of the rubber-like polymer. The results of measurement and evaluation are shown in Table 1.

Comparative Example 1

The same polymerizations as in Example 1 were conducted with the exception of not using divinylbenzene and using 0.01 part by weight of t-dodecylmercaptan, whereby pellets of a rubber-modified polystyrene resin composition were obtained.

The soft component particles in the composition had a so-called salami structure wherein plural styrene resin fine particles were present as dispersed in the continuous phase of the rubber-like polymer. The results of measurement and evaluation are shown in Table 1.

Comparative Example 2

The same polymerizations as in Comparative Example 1 were conducted with the exception of using 2.2 parts by weight of a mineral oil, whereby pellets of a rubber-modified polystyrene resin composition were obtained.

The soft component particles in the composition had a so-called salami structure wherein plural styrene resin fine particles were present as dispersed in the continuous phase of the rubber-like polymer. The results of measurement and evaluation are shown in Table 1.

Comparative Example 3

An attempt was made to conduct polymerization under the same conditions as in Example 1 with the exception of using 900 wt. ppm of divinylbenzene (as the compound containing at least two vinyl groups: purity of 55% by weight, manufactured by Tokyo Kasei Kogyo Co., Ltd.). The attempt, however, failed because the molecular weight excessively increased and caused excessive load, failing to conduct the desired polymerization.

EXAMPLE 2

A thorough mixing type stirring vessel for polymerization was charged with a mixture of 14.5 parts by weight of a styrene-butadiene block copolymer rubber (product of Asahi Chemical Industry Co., Ltd., trade name "Asaprene 670A"), 100 parts by weight of styrene, 5.2 parts by weight of ethylbenzene, 0.2 part by weight of a mineral oil, 0.04 part by weight of t-dodecylmercaptan and 300 wt. ppm (relative to styrene) of divinylbenzene (as the compound containing at least two vinyl groups: purity of 55% by weight, manufactured by Tokyo Kasei Kogyo Co., Ltd.). The mixture was polymerized in the vessel at 140° C. with stirring at 30 rpm until a conversion of 36% by weight was reached.

The obtained reaction mixture was further polymerized until the conversion reached 75% by weight using a plug-flow type polymerization vessel at a temperature of 130° to 165° C.

The resulting polymerization mixture was introduced to a preheater at 225° C. and passed through a vacuum deaerator maintained at 250° C. to evaporate off the volatile matter, whereby a rubber-modified polystyrene resin composition was produced in the form of pellets.

The soft component particles in the composition had a unitary occlusion structure comprising a core and a shell having the core occluded therein, the core being solely composed of the styrene resin in the form of a continuous phase and the shell being composed of the rubber-like polymer. The results of measurement and evaluation are shown in Table 2.

Comparative Example 4

The same polymerizations as in Example 2 were conducted with the exception of not using divinylbenzene (0 wt. ppm) and using 0.02 part by weight of t-dodecylmercaptan, whereby pellets of a rubber-modified polystyrene resin composition were obtained.

The soft component particles in the composition had a unitary occlusion structure comprising a core and a shell having the core occluded therein, the core being solely composed of the styrene resin in the form of a continuous phase and the shell being composed of the rubber-like polymer. The results of measurement and evaluation are shown in Table 2.

Comparative Example 5

The same polymerizations as in Comparative Example 4 were conducted with the exception of using 1.7 parts by weight of a mineral oil, whereby pellets of a rubber-modified polystyrene resin composition were obtained.

The soft component particles in the composition had a unitary occlusion structure comprising a core and a shell having the core occluded therein, the core being solely composed of the styrene resin in the form of a continuous phase and the shell being composed of the rubber-like polymer. The results of measurement and evaluation are shown in Table 2.

EXAMPLE 3

Using a 20-liter thorough mixing type autoclave equipped with a stirrer, 6.0 parts by weight of a middle cis-polybutadiene (product of Asahi Chemical Industry Co., Ltd., trade name "Diene 55AS") was dissolved in 100 parts by weight of styrene and 300 wt.ppm (relative to styrene) of divinylbenzene (as the compound containing at least two vinyl groups : purity of 55% by weight, manufactured by Tokyo Kasei Kogyo Co., Ltd.). To the solution was added 0.014 part by weight of n-dodecylmercaptan at the start of bulk polymerization. The mixture was subjected to bulk polymerization with stirring at 220 rpm at 120° C. for 2.5 hours to achieve a styrene conversion of 22% by weight.

To the polymerization mixture were added 50 parts by weight of water, 0.6 part by weight of calcium tertiary phosphate, 10 wt. ppm of sodium dodecylbenzenesulfonate, 0.28 part by weight of benzoyl peroxide and 0.15 part by weight of t-butylperoxybenzoate. The mixture was subjected to suspension polymerization at 90° C. for 3 hours and at 140° C. for 1 hour with stirring at 220 rpm. The obtained polymer suspension was admixed with hydrochloric acid and the mixture was filtered. The obtained polymer was washed with water, dried and pelletized by an extruder, giving a rubber-modified polystyrene resin composition.

The soft component particles in the composition had a so-called salami structure wherein plural styrene resin fine particles were present as dispersed in the continuous phase of the rubber-like polymer. The results of measurement and evaluation are shown in Table 3.

EXAMPLE 4

The same polymerizations as in Example 3 were performed with the exception of using 500 wt. ppm (relative to styrene) of divinylbenzene (as the compound containing at least two vinyl groups:purity of 55% by weight, manufactured by Tokyo Kasei Kogyo Co., Ltd.), 0.6 part by weight of benzoyl peroxide and 0.075 part by weight of t-butylperoxybenzoate and adjusting the speed of stirring during the bulk polymerization to 165 rpm, whereby pellets of a rubber-modified polystyrene resin composition were obtained.

The soft component particles in the composition had a so-called salami structure wherein plural styrene resin fine particles were present as dispersed in the continuous phase of the rubber-like polymer. The results of measurement and evaluation are shown in Table 3.

EXAMPLE 5

The same polymerizations as in Example 4 were carried out with the exception of adding divinylbenzene 1.5 hours after the start of the bulk polymerization, whereby pellets of a rubber-modified polystyrene resin composition were obtained.

The soft component particles in the composition had a so-called salami structure wherein plural styrene resin fine particles were present as dispersed in the continuous phase of the rubber-like polymer. The results of measurement and evaluation are shown in Table 3.

Comparative Example 6

The same polymerizations as in Example 4 were effected with the exception of not using divinylbenzene (0 wt. ppm), and using 0.3 part by weight of benzoyl peroxide and 0.075 part by weight of t-butylperoxybenzoate, whereby pellets of a rubber-modified polystyrene resin composition were obtained.

The soft component particles in the composition had a so-called salami structure wherein plural styrene resin fine particles were present as dispersed in the continuous phase of the rubber-like polymer. The results of measurement and evaluation are shown in Table 3.

Comparative Example 7

The same polymerizations as in Example 3 were conducted with the exception of adding 1.1 parts by weight of a mineral oil during the feed of the components for bulk polymerization, not using divinylbenzene (0 wt. ppm) and using 0.075 part by weight of t-butylperoxybenzoate, whereby pellets of a rubber-modified polystyrene resin composition were obtained.

The soft component particles in the composition had a so-called salami structure wherein plural styrene resin fine particles were present as dispersed in the continuous phase of the rubber-like polymer. The results of measurement and evaluation are shown in Table 3.

Comparative Example 8

The same polymerizations as in Comparative Example 6 were carried out with the exception of adding 2.5 parts by weight of a mineral oil during the feed of the components for bulk polymerization, whereby pellets of a rubber-modified polystyrene resin composition were obtained.

The soft component particles in the composition had a so-called salami structure wherein plural styrene resin fine particles were present as dispersed in the continuous phase of the rubber-like polymer. The results of measurement and evaluation are shown in Table 4.

EXAMPLE 6

The same polymerizations as in Example 3 were performed with the exception of using a high cis-polybutadiene (product of Ube Industries Ltd., trade name "Ubepol BR 22H") as the rubber, adjusting the speed of stirring during the bulk polymerization to 250 rpm, and using 0.45 part by weight of benzoyl peroxide and 0.075 part by weight of t-butylperoxybenzoate for suspension polymerization, whereby pellets of a rubber-modified polystyrene resin composition were obtained.

The soft component particles in the composition had a so-called salami structure wherein plural styrene resin fine particles were present as dispersed in the continuous phase of the rubber-like polymer. The results of measurement and evaluation are shown in Table 4.

Comparative Example 9

The same polymerizations as in Example 6 were effected with the exception of not using divinylbenzene (0 wt. ppm), and using 0.3 part by weight of benzoyl peroxide for suspension polymerization, whereby pellets of a rubber-modified polystyrene resin composition were obtained.

The soft component particles in the composition had a so-called salami structure wherein plural styrene resin fine particles were present as dispersed in a continuous phase of the rubber-like polymer. The results of measurement and evaluation are shown in Table 4.

In Tables 1 to 4, the term "particle diameter (μm)" means an average particle diameter of the soft component particles as measured by the method described in this specification, and the term "Mw-GPC" means a weight average molecular weight of the matrix polystyrene as measured by the method described in this specification.

The results show the following. The compositions prepared in Examples 1 to 6 according to the present invention achieved satisfactory results in balance of the evaluations.

In contrast, the composition of Comparative Example 1 with a low number of branching points Bn(Mz) was poor in flowability, and the composition of Comparative Example 2 prepared using a large amount of oil was inferior in heat resistance. The procedure using a large amount of divinylbenzene in Comparative Example 3 failed to effect polymerization. The composition of Comparative Example 4 with a low number of branching points Bn(Mz) was poor in flowability. The composition of Comparative Example 5 prepared using a large amount of oil showed a low heat resistance. The composition of Comparative Example 6 with a low number of branching points Bn(Mz) displayed a low flowability. The compositions of Comparative Examples 7 and 8 prepared using a large amount of oil showed a low heat resistance. The compositions of Comparative Example 9 with a low number of branching points Bn(Mz) was inferior in flowability.

Among these compositions, the compositions of Examples 1, 2 and 3 which fulfilled the requirement of claim 2 for the particle diameter of soft component particles gave moldings which had an outstanding appearance with a glossy surface in the sense that they were excellent in the gloss ($G_{0S}$) of the portion corresponding to the vicinity of the gate and also exhibited low degree of gloss reduction in the portion corresponding to the cavity part away from the gate.

TABLE 1

|  | Ex. 1 | Com. Ex. 1 | Com. Ex. 2 | Com. Ex. 3[*4] |
|---|---|---|---|---|
| Structure | | | | |
| Particle diameter (μm) | 0.7 | 0.8 | 0.7 | |
| Mw-GPC (×10,000) | 23.5 | 20.5 | 21.0 | |
| Number of branching points Bn (Mz) | 5.6 | 1.7 | 1.1 | |

TABLE 1-continued

|  | Ex. 1 | Com. Ex. 1 | Com. Ex. 2 | Com. Ex. 3[*4] |
|---|---|---|---|---|
| Structure |  |  |  |  |
| Oil (wt. %)[*1] | 0.8 | 0.8 | 2.6 |  |
| Gel amount (wt. %)[*2] | 13.9 | 14.9 | 13.8 |  |
| Swelling index | 13.5 | 13.8 | 14.0 |  |
| Evaluation |  |  |  |  |
| Melt flow rate (g/10 min.) | 4.7 | 3.8 | 5.0 |  |
| Vicat softening point (°C.) | 94.6 | 94.9 | 88.9 |  |
| Izod impact strength (kg cm/cm) | 8.0 | 9.8 | 9.6 |  |
| Flexural modulus (kg/cm$^2$) | 24200 | 23800 | 23700 |  |
| DVB (wt. ppm)[*3] | 340 | 0 | 0 | 900 |
| Molding appearance |  |  |  |  |
| $G_{05}$ % | 99.9 | 94.7 | 99.8 | — |
| $G_{35}$ % | 96.4 | 83.2 | 96.0 | — |
| Gloss reduction degree (%) | 96.5 | 87.8 | 96.2 | — |

TABLE 2

|  | Ex. 2 | Com. Ex. 4 | Com. Ex. 5 |
|---|---|---|---|
| Structure |  |  |  |
| Particle diameter (μm) | 0.2 | 0.2 | 0.2 |
| Mw-GPC (×10,000) | 21.9 | 22.3 | 21.0 |
| Number of branching points Bn (Mz) | 5.1 | 0.4 | 0.5 |
| Oil (wt. %)[*1] | 0.2 | 0.2 | 1.8 |
| Gel amount (wt. %)[*2] | 25.2 | 26.1 | 25.9 |
| Swelling index | 13.1 | 12.8 | 13.5 |
| Evaluation |  |  |  |
| Melt flow rate (g/10 min.) | 5.3 | 3.0 | 5.2 |
| Vicat softening point (°C.) | 95.8 | 95.5 | 89.8 |
| Izod impact strength (kg cm/cm) | 6.0 | 6.8 | 6.6 |
| Flexural modulus (kg/cm$^2$) | 20000 | 19000 | 19300 |
| DVB (wt. ppm)[*3] | 300 | 0 | 0 |
| Molding appearance |  |  |  |
| $G_{05}$ % | 101.2 | 100.2 | 102.0 |
| $G_{35}$ % | 95.1 | 85.0 | 91.7 |
| Gloss reduction degree (%) | 94.0 | 84.8 | 89.9 |

TABLE 4

|  | Com. Ex. 8 | Ex. 6 | Com. Ex. 9 |
|---|---|---|---|
| Structure |  |  |  |
| Particle diameter (μm) | 1.7 | 1.9 | 1.9 |
| Mw-GPC (±10,000) | 21.5 | 22.9 | 23.5 |
| Number of branching points Bn (Mz) | 0.2 | 6.0 | 0.2 |
| Oil (wt. %)[*1] | 2.3 | 0 | 0 |
| Gel amount (wt. %)[*2] | 17.5 | 13.6 | 14.1 |
| Swelling index | 16.0 | 21.2 | 21.7 |
| Evaluation |  |  |  |
| Melt flow rate (g/10 min.) | 6.0 | 4.6 | 2.8 |
| Vicat softening point (°C.) | 89.5 | 95.6 | 95.4 |
| Izod impact strength (kg cm/cm) | 7.3 | 8.4 | 8.7 |
| Flexural modulus (kg/cm$^2$) | 20100 | 24000 | 23000 |
| DVB (wt. ppm)[*3] | 0 | 300 | 0 |

[*1]Amount of feed oil (wt %) ÷ final conversion (%) ± 100 (i.e., amount of mineral oil in the pellet)
[*2]proportion by weight of soft component particles in resin composition (%)
[*3]Amount of Divinylbenzene relative to styrene
[*4]Polymerization was impossible.

TABLE 3

|  | Ex. 3 | Ex. 4 | Ex. 5 | Com. Ex. 6 | Com. Ex. 7 |
|---|---|---|---|---|---|
| Structure |  |  |  |  |  |
| Particle diameter (μm) | 1.3 | 1.7 | 1.7 | 1.9 | 1.3 |
| Mw-GPC (×10,000) | 20.8 | 23.1 | 22.1 | 20.9 | 21.3 |
| Number of branching points Bn (Mz) | 3.8 | 7.6 | 8.2 | 0.8 | 1.0 |
| Oil (wt. %)[1] | 0 | 0 | 0 | 0 | 1.0 |
| Gel amount (wt. %)[*2] | 18.0 | 17.2 | 17.3 | 17.8 | 18.1 |
| Swelling index | 16.4 | 15.5 | 14.7 | 14.6 | 15.7 |
| Evaluation |  |  |  |  |  |
| Melt flow rate (g/10 min. | 4.5 | 6.0 | 5.7 | 2.7 | 4.5 |
| Vicat softening point (°C.) | 95.6 | 95.3 | 95.9 | 96.2 | 93.7 |
| Izod impact strength (kg cm/cm) | 6.9 | 6.3 | 6.2 | 7.8 | 7.5 |
| Flexural modulus (kg/cm$^2$) | 21700 | 20900 | 20600 | 20200 | 20000 |
| DVB (wt. ppm)[*3] | 300 | 500 | 500 | 0 | 0 |
| Molding appearance |  |  |  |  |  |
| $Go_{05}$ % | 96.1 |  |  | 88.5 |  |
| $G_{35}$ % | 91.8 |  |  | 62.3 |  |
| Gloss reduction degree (%) | 95.5 |  |  | 70.4 |  |

As described above, the present invention provides rubber-modified polystyrene resin compositions which contain a rubber elastomer to improve the impact strength and which are excellent in heat resistance and flowability, as well as injection-molded articles having a glossy appearance.

What is claimed is:

1. A diene rubber-modified branched polystyrene resin composition, comprising a polystyrene resin matrix and soft component particles dispersed therein, wherein:
    (a) the polystyrene resin has a weight average molecular weight of 150,000 to 500,000 and the polystyrene resin has a branch count or number of branching points in the Z-average molecular weight thereof of 2 to 20;
    (b) the soft component particles in the composition have an average particle diameter of 0.1 to 10 μm;
    (c) the soft component particles in the composition have a swelling index in the range of 3 to 30; and
    (d) the soft component particles are present in the resin composition in an amount of 5 to 30% by weight based upon the weight of the resin composition.

2. The diene rubber-modified branched polystyrene resin composition according to claim 1, wherein the soft component particles have an average particle diameter of 0.1 to 1.5 μm.

3. The diene rubber-modified branched polystyrene resin composition according to claim 1, wherein the matrix polystyrene resin has a branch count or number of branching points in the Z-average molecular weight (Mz) of 3 to 15.

4. The diene rubber-modified branched polystyrene resin composition according to claim 1, wherein the soft component particles have a swelling index in the range of 8 to 20.

5. The diene rubber-modified branched polystyrene resin composition according to claim 1, wherein the soft component particles are present in the resin composition in an amount of 8 to 30% by weight based upon the weight of the resin composition.

6. The diene rubber-modified branched polystyrene resin composition according to claim 1, wherein said polystyrene resin matrix is a polymer prepared by polymerizing a styrene monomer selected from the group consisting of styrene, an α-substituted alkylstyrene and a nuclearly substituted alkylstyrene, in the presence of 100 to 800 ppm by weight, relative to the styrene monomer, of a compound having a plurality of vinyl groups and copolymerizable with the styrene monomer, or said polystyrene resin matrix is a copolymer prepared by polymerizing said styrene monomer and a compound selected from the group consisting of acrylonitrile, methacrylonitrile, methacrylic acid, methylmethacrylate, maleic anhydride, maleimide and nuclearly substituted maleimide, in the presence of 100 to 800 ppm by weight, relative to the styrene monomer, of a compound having a plurality of vinyl groups and copolymerizable with the styrene monomer.

7. The diene rubber-modified branched polystyrene resin composition according to claim 6, wherein said α-substituted alkylstyrene is α-methylstyrene.

8. The diene rubber-modified branched polystyrene resin composition according to claim 6, wherein said nuclearly substituted alkylstyrene is p-methylstyrene.

9. The diene rubber-modified branched polystyrene resin composition according to claim 1, wherein the soft component particles each comprises a diene rubber elastomer and a polystyrene resin, wherein said elastomer is selected from the group consisting of polybutadiene, a styrene-butadiene copolymer and an ethylene-propylene-nonconjugated diene terpolymer, and said polystyrene resin is a polymer prepared by polymerizing a styrene monomer selected from the group consisting of styrene, an α-substituted alkylstyrene and a nuclearly substituted alkylstyrene, in the presence of 100 to 800 ppm by weight, relative to the styrene monomer, of a compound having a plurality of vinyl groups and copolymerizable with the styrene monomer, or said polystyrene matrix is a copolymer prepared by polymerizing said styrene monomer and a compound selected from the group consisting of acrylonitrile, methacrylonitrile, methacrylic acid, methylmethacrylate, maleic anhydride, maleimide and nuclearly substituted maleimide, in the presence of 100 to 800 ppm by weight, relative to the styrene monomer, of a compound having a plurality of vinyl groups and copolymerizable with the styrene monomer.

10. The diene rubber-modified branched polystyrene resin composition according to claim 9, wherein said α-substituted alkylstyrene is α-methylstyrene.

11. The diene rubber-modified branched polystyrene resin composition according to claim 9, wherein said nuclearly substituted alkylstyrene is p-methylstyrene.

12. The diene rubber-modified branched polystyrene resin composition according to claim 1, wherein the polystyrene resin is made branched with use of a compound having a plurality of vinyl groups.

13. The diene rubber-modified branched polystyrene resin composition according to claim 12, wherein the compound having a plurality of vinyl group is selected from the group consisting of divinylbenzene and ethylene glycol dimethacrylate.

* * * * *